Patented Sept. 29, 1931

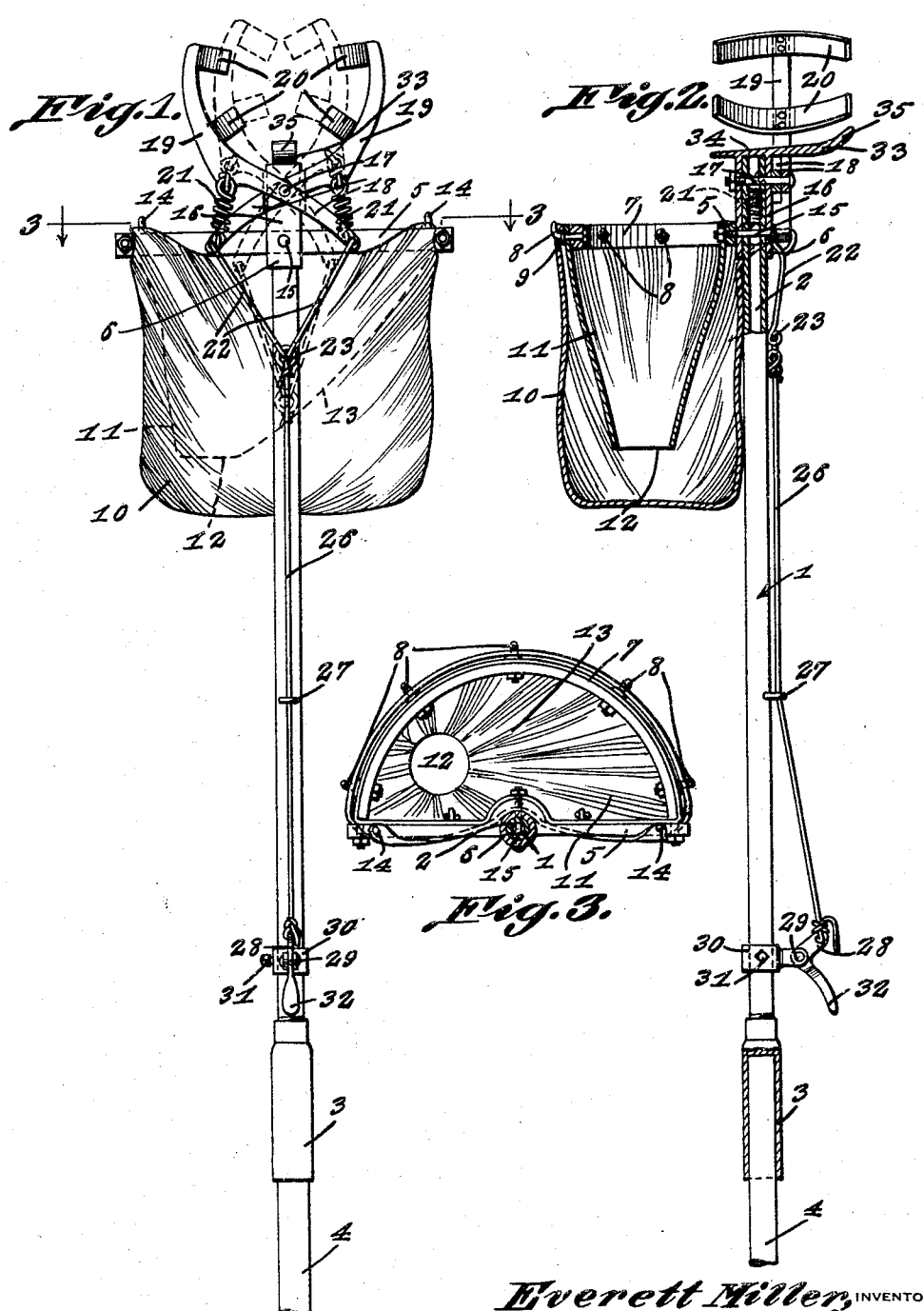

1,825,599

UNITED STATES PATENT OFFICE

EVERETT MILLER, OF BLACKFORK, OHIO

APPLE PICKER

Application filed May 27, 1930. Serial No. 456,262.

This invention relates to an improvement in fruit pickers and, while designed primarily for use in picking apples from apple trees may be employed in picking other fruit and one of the objects of the present invention is to provide a device for this purpose which may be employed by one standing on the ground thereby obviating the necessity of climbing a tree in order to pick the fruit and, by the use of which device the fruit may be picked without liability of marring or bruising the fruit.

Another object of the invention is to provide a fruit picking device embodying means for gripping the fruit to be picked, so that it may be stripped from its stem from the branch of the tree and, in combination with this means, a novel receptacle for the picked fruit and, with reference to the receptacle, the invention has as a further object to provide one so constructed that the fruit will be delivered into the receptacle and collected thereby without any likelihood of one apple, for example, impacting another apple, in the picking operation.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 1 is a view in elevation of the device embodying the invention.

Figure 2 is a vertical front to rear sectional view through the device, parts being shown in elevation.

Figure 3 is a horizontal sectional view taken substantially on the line 3—3 of Figure 1, looking in the direction indicated by the arrows.

The device comprises a handle which is indicated in general by the numeral 1 and this handle is formed of metal and of light tubular construction and is reduced in diameter at its upper end as indicated by the numeral 2 and provided at its lower end with a ferrule 3 into which a second wooden handle 4 may be fitted, when a handle longer than the handle 1 is found desirable. A cross head 5 is secured, intermediate its ends to a tubular shank 6 which is fitted to the reduced upper end 2 of the handle 1 and this cross head constitutes means for supporting the receptacle for the picked fruit. This receptacle comprises an approximately semi-circular frame 7 of sheet metal or wood, either as may be found desirable to use, and hooks 8 are arranged in a series about the arcuate side of the said frame and are engageable in openings 9 formed in the mouth of a receiving bag 10 which is of cloth or any other suitable flexible material, the mouth of the bag being disposed about the said frame 7 in the manner shown in Figure 3 of the drawings and being, by the hooks 8, separably connected with the frame so that after the bag has been nearly filled, it may be separated from the frame and another bag substituted therefor, the apples poured out of the bag into a larger receptacle and the bag replaced upon the frame.

The receptacle further comprises a throat member 11 which is also of flexible material and which is likewise arranged about the frame 7 and with its open top within the mouth of the bag and this throat member is so formed that it will be of gradually decreasing circumferential dimensions in the direction of its lower discharge end, which end is open as indicated by the numeral 12, and it will be observed by reference to Figures 1 and 2 of the drawings that this end of the throat member 11 terminates adjacent the bottom of the bag 10 and at one side of the said bag so that one side wall of the throat member is located opposite a fruit guiding member which is arranged between the gripping members of the picker as will presently be explained, and at this point it will be understood that fruit delivered into the throat member 11 will strike the inclined wall portion thereof which is indicated in the drawings by the numeral 13 and rolled down this portion and through the lower open end 12 of the throat member and into the bag 10 instead of being dropped directly into the bag, thereby preventing impactive contact of the dropped fruit with other fruit which has already been deposited in the bag, which has caused a bruising of the fruit. In addition to being supported by the hooks 8, the bag 10 is likewise formed with openings adapting it to be engaged with upstanding pins 14 at the upper side of the cross head 5 and at the ends of said cross head.

A bolt 15 is secured through the ferrule 6 and through a tubular head 16 which is fitted over the ferrule and a bolt 17, which is fitted through the said head 16 and ferrule 6, constitutes a pivot for the arms 18 of two gripping members, each of which includes, above the pivot 17, an upwardly curved extension 19 the inner sides of these extensions being of concave curvilinear form as clearly shown in Figure 1, and riveted or otherwise secured, between their ends, to the inner side of each extension, are gripping members 20, these members being of sheet metal or of wood and being of the curvilinear form shown most clearly in Figures 1 and 2 of the drawings. The members 20 are of dimensions to embrace opposite sides of an apple of ordinary size or the opposite sides of any other fruit to be picked, and the gripping members are normally held relatively separated as shown in full lines in Figure 1, through the medium of tension springs 21 which are connected at their upper ends to the extension 19, above and beyond the pivot 17 and, at their lower ends, to the lower or outer ends of the arms 18 and, in order that the gripping members 20 may be brought into gripping engagement with the apple to be picked, by being swung toward each other, links 22 are pivotally connected at their upper ends to the lower ends of the arms 18 and at their lower ends to a ring 23 which is connected with, and a flexible cable 26 leading downwardly beside the handle 1 and through a guide 27 upon one side of the handle. The lower portion of the cable or flexible element 26 is tied or otherwise connected to the upper arm of a rock lever 28 pivotally mounted as at 29 upon a collar 30 which is held in positions of adjustment upon the handle 1 by means of a set bolt 31.

The rock lever 28 also comprises a hand grip 32 by means of which the lever may be rocked, this grip for this purpose being grasped preferably at the same time the handle 1 is grasped, so that the hand grip 32 is swung toward the handle and the arm 28 of the lever is swung downwardly thus exerting a pull upon the flexible element 26 and a downward pull upon the links 22 so as to swing the gripping members comprising the arms 18 and extensions 19 about the pivot 17 and bring the gripping element 20 thereof into gripping engagement with the fruit to be picked. The parts will at this time assume the dotted line position shown in Figure 1 and it will be understood that when the hand grip 32 of the rock lever is relieved of pressure, the springs 18 will immediately swing the gripping members away from each other so as to release the fruit which has been picked.

In order that the fruit, when released by the gripping members may be directed or guided into the throat member 11 and finally into a bag 10, a guiding member 33 is provided and this member is preferably formed of sheet metal and is mounted, in any suitable manner, upon the upper end of the sleeve 16 and the upper side of this member, indicated by the numeral 34, is inclined downwardly and inwardly in the direction of that end of the member which is located above one side of the open top of the throat member 11, the opposite end portion of the member 33 being curved upwardly as indicated by the numeral 35 so as to avoid any likelihood of the fruit rolling over the member in the reverse direction and therefore falling to the ground.

What I claim is:—

A fruit picker comprising a handle a guide member mounted transversely across the end thereof and having an inclined upper surface, fruit gripping members pivotally mounted upon the handle at a point below the guide member, said fruit gripping members having end portions lying at the opposite sides of the guide and adapted to move toward the guide in gripping the fruit, a receptacle supported in position to receive the fruit from the guide and means operable to effect movement of the gripping members toward the guide.

In testimony whereof I affix my signature.

EVERETT MILLER.